May 1, 1962 K. G. REED ET AL 3,031,843

ROCKET HAVING MEANS FOR RENDERING IT VISIBLE OVER ITS OPERATIONAL RANGE

Filed Jan. 6, 1959

INVENTORS:
Kenneth Gordon Reed &
William Hugh Nicholson,
BY Cushman, Darby & Cushman
ATTORNEYS.

United States Patent Office 3,031,843
Patented May 1, 1962

3,031,843

ROCKET HAVING MEANS FOR RENDERING IT VISIBLE OVER ITS OPERATIONAL RANGE

Kenneth Gordon Reed and William Hugh Nicolson, Kidderminster, England, assignors to Imperial Chemical Industries Limited, Millbank, London, England, a corporation of Great Britain Filed Jan. 6, 1959, Ser. No. 785,199
Claims priority, application Great Britain Jan. 8, 1958
1 Claim. (Cl. 60—35.6)

This invention is concerned with rockets and is specifically concerned with the provision, on a rocket, of a means for rendering the rocket more readily visible over its operational range for the purpose of guidance.

Figure 1:
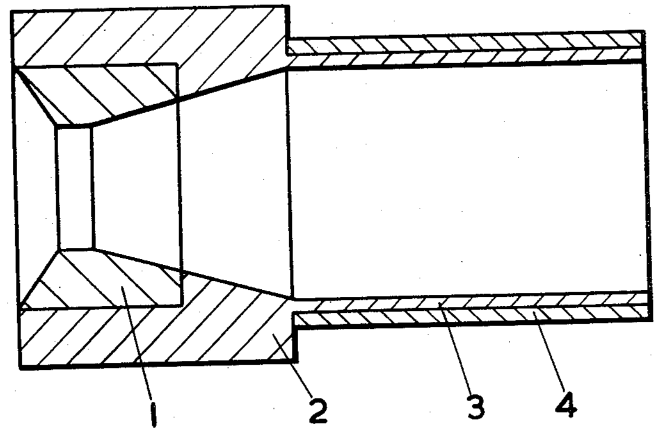
Figure 2:
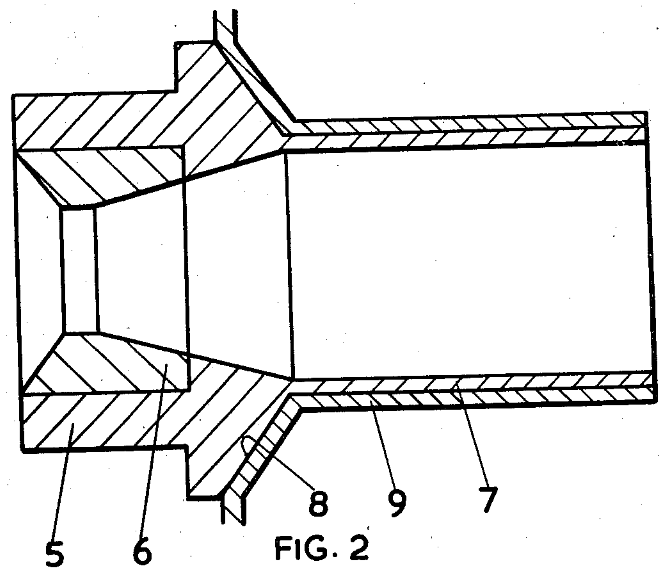

FIGURE 1 is a longitudinal sectional view of a rocket motor embodying the principles of the present invention; and FIGURE 2 is a longitudinal sectional view of a modified form of the rocket motor of FIGURE 1.

According to this invention we provide a rocket motor in which the external surface of the rocket motor nozzle and/or the surface of an extension to the nozzle having a coating of a material capable of ignition at the temperature attained by the nozzle and/or extension during operation of the rocket motor.

Preferably the material is a metal such as, for example, magnesium.

In the case of a metal we prefer to flame-spray it on to the external surface of the nozzle or on to the external surface of an extension to the nozzle, but it may be electrodeposited or it may be in ribbon form and be helically wound on to such an external surface.

When an extension to the nozzle is used, it may be a tube which is coaxial with the rocket motor nozzle, the material being on the external surface of the tube. The extension may, however, be of other than tubular form and be inclined at an angle to the axis of the rocket motor nozzle, say for example, an apertured plate, in which case its axis is at right angles to the axis of the nozzle and the material is coated on the rearwardly-directed surface of the extension, or on the forwardly-directed surface of the extension or on both these surfaces, according as to the position from which the rocket is to be observed during its flight. The extension is preferably of steel or of a refractory metal, and has a small thickness.

During operation of the rocket motor, when the material has been heated to its ignition temperature by conduction of heat through the wall of the nozzle and/or wall of the extension from the hot exhaust gases of the rocket motor, it is ignited and provides a source of intense light.

Furthermore, if air which has passed over the burning material is entrained into the exhaust gases issuing from the nozzle or extension, any unignited gases may be ignited.

The amount of light produced by the burning material, and hence the distance from which it is visible, is dependent upon the surface area of the material. The duration of burning is dependent upon the thickness of material applied. The time interval between ignition of the motor and of the material is dependent upon several factors viz.:

(*a*) The temperature, mass flow and velocity of the exhaust gases;

(*b*) The thickness and thermal conductivity of the extension;

(*c*) The thickness of the material applied; and (*d*) The ignition temperature of the material.

In FIGURE 1 of the accompanying drawings the choke 1 of a rocket motor for use with a rocket is fitted into a choke housing and expansion cone 2 which is integral with a thin-walled cylindrical extension member 3. The external surface of the extension member 3 has a layer of magnesium 4. This layer of magnesium is deposited on the external surface of the extension member 3 by a flame-spraying operation. During operation of the rocket motor when the magnesium has been heated to its ignition temperature by conduction of heat, the magnesium provides a constant white light source with only a small amount of sputtering.

The external surface of the extension may be modified as compared with that shown in FIGURE 1 to increase the amount of light visible from any desired position which is remote from the rocket in which the motor is embodied. This is illustrated in FIGURE 2 of the accompanying drawings where 5 is the choke housing and expansion cone, 6 is the choke and 7 is a thin-walled cylindrical extension member integral with the choke housing 5. The choke housing 5 has an inclined outer surface 8 and this surface together with external surface of the extension has on it a layer of magnesium 9.

In other embodiments, the extension may be inclined at an angle to the axis of the rocket motor nozzle, say, for example, at a right-angle, instead of being parallel to the axis.

We claim:

In a rocket motor having exhaust conduit means through which pass hot propulsion gases, said exhaust conduit means having external surfaces and being of predetermined thickness and thermal conductivity; a layer of magnesium of known ignition temperature on and coating a substantial portion of said external surfaces, said layer having a predetermined thickness determined by the desired duration of the burning of said layer, said layer having a predetermined surface area determined by the desired amount of light to be produced during burning of said layer, and the outer surface of said layer of magnesium being substantially completely exposed, whereby said layer will be ignited within a desired time interval after operation of said rocket motor by heat conducted through said exhaust conduit means to said layer, and whereby said ignited layer will render the trajectory of said rocket motor visible.

References Cited in the file of this patent

UNITED STATES PATENTS

| | | |
|---|---|---|
| 1,304,962 | Gravely | May 27, 1919 |
| 2,469,421 | Tuve | May 10, 1949 |
| 2,829,596 | Loedding | Apr. 8, 1958 |
| 2,868,129 | Johnson et al. | Jan. 13, 1959 |
| 2,926,606 | Bangs et al. | Mar. 1, 1960 |